United States Patent
Barth

(10) Patent No.: US 9,746,320 B2
(45) Date of Patent: Aug. 29, 2017

(54) DEVICE FOR ADJUSTING THE LIGHT SOURCE OF AN ELECTRONIC ALIGNMENT DEVICE, OPERATION BEING SIMPLIFIED BY MOTORIZED ADJUSTMENT OF THE LIGHT SOURCE, AND A METHOD IN WHICH THIS DEVICE IS USED

(75) Inventor: Rudolf Barth, Karlsfeld (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 758 days.

(21) Appl. No.: 12/980,976

(22) Filed: Dec. 29, 2010

(65) Prior Publication Data

US 2011/0161034 A1    Jun. 30, 2011

(30) Foreign Application Priority Data

Dec. 29, 2009 (DE) .................... 10 2009 060 848
Dec. 8, 2010 (DE) .................... 10 2010 053 750

(51) Int. Cl.
  *G01C 17/38* (2006.01)
  *G01B 11/27* (2006.01)
  *G01B 21/24* (2006.01)

(52) U.S. Cl.
  CPC ............ *G01B 11/272* (2013.01); *G01B 21/24* (2013.01)

(58) Field of Classification Search
  CPC .................. G01B 11/272; G01B 21/24
  USPC ...................... 702/94, 95; 356/153
  See application file for complete search history.

(56) References Cited

U.S. PATENT DOCUMENTS

| 4,518,855 | A | 5/1985 | Malak |
|---|---|---|---|
| 4,709,485 | A | 12/1987 | Bowman |
| 4,774,405 | A | 9/1988 | Malin |
| 5,026,998 | A | 6/1991 | Hölz |
| 6,040,903 | A | 3/2000 | Lysen et al. |
| 6,223,102 | B1 | 4/2001 | Busch |
| 6,337,742 | B2 | 1/2002 | Lysen et al. |
| 6,356,348 | B1 | 3/2002 | Lysen et al. |
| 6,741,340 | B2 | 5/2004 | Murakawa et al. |
| 6,763,597 | B2 * | 7/2004 | Lysen .............. 33/286 |
| 6,970,627 | B2 | 11/2005 | Koishi et al. |
| 2004/0263807 | A1 * | 12/2004 | Kitabayashi ........... G03B 21/14 353/122 |
| 2006/0038967 | A1 * | 2/2006 | Kitabayashi ........... G03B 21/14 353/119 |
| 2009/0207404 | A1 * | 8/2009 | Tamayo De Miguel et al. .............. 356/237.2 |

FOREIGN PATENT DOCUMENTS

| DE | 199 07 880 A1 | 8/2000 |
|---|---|---|
| GB | 2 414 549 A | 11/2005 |
| WO | WO 0049365 A1 * | 8/2000 |

OTHER PUBLICATIONS

Machine translation for WO0049365A1.*

* cited by examiner

*Primary Examiner* — Gregory J Toatley
*Assistant Examiner* — Eman Alkafawi
(74) *Attorney, Agent, or Firm* — David S. Safran

(57) ABSTRACT

Method and device for precision adjustment of the beam direction of the light source of a device for aligning two objects relative to one another, the beam direction being moved by a motor via input elements of the computer of the alignment device.

12 Claims, 2 Drawing Sheets

DEVICE FOR ADJUSTING THE LIGHT SOURCE OF AN ELECTRONIC ALIGNMENT DEVICE, OPERATION BEING SIMPLIFIED BY MOTORIZED ADJUSTMENT OF THE LIGHT SOURCE, AND A METHOD IN WHICH THIS DEVICE IS USED

BACKGROUND OF THE INVENTION

Field of the Invention

The invention relates to a device for adjusting the light source of an electronic alignment device, operation being simplified by motorized adjustment of the light source, and a method in which this device is used.

Description of Related Art

German Patent Application DE 39 11 307 A1 and corresponding U.S. Pat. No. 5,026,998, and German Patent Application DE 38 14 466 A1 and corresponding U.S. Pat. No. 6,356,348 describe that the alignment of two coupled shafts which, for example, connect a motor to a motor driven pump, can be checked and corrected by means of two components of the alignment device which are attached to these shafts, the components containing at least one light source, preferably a semiconductor laser or a light emitting diode, and at least one detector. A third component which, likewise, belongs to the alignment device is a portable computer for display of the misalignment and required corrections. When the two first-named components of the alignment device are fastened on the shafts, as a result of existing misalignment, setting of the laser beam direction, which can be done with great precision takes place with the objective of the laser beam striking roughly the middle of the detector zone. This setting of the laser is performed by hand with screws and suitable bell cranks. This is especially difficult if, on the one hand, the target of the laser beam which is mounted on the second shaft must be observed, and at the same time, the grips of the screws must be operated, the components of the alignment device which contain the laser source being located on the first shaft. This object is additionally made difficult by poor light conditions, a rough environment and often poor accessibility of the space between the motor and machine.

SUMMARY OF THE INVENTION

The invention facilitates and automates setting of the laser beam direction relative to the at least one detector by the provision of a motorized drive for precision adjustment of the laser on the part of the device which contains the laser. The computer of the alignment device whose display represents the existing misalignment and gives instructions for correction is designed in accordance with the invention for control of the motors to take place from this evaluation device via its input device. A method in accordance with the invention which uses this device calls for the required adjustment of the direction of the laser beam to the middle of the detector surface to be performed automatically under the control of the computer of the alignment device by means of the motors of the device after mounting of the corresponding components of the alignment device on the shafts; therefore, it is performed before the actual alignment process.

A second method in accordance with the invention comprises adjusting the direction of the laser beam by the computer of the alignment device by means of the motorized drive. In the alignment process itself, if the shafts are turned into different angular positions, it is possible for the impact point of the laser beam to reach the edge of the detector. By means of this second method of adjusting the direction of the laser beam by the computer of the alignment device by means of the motorized drive with the shaft stationary, the impact point of the laser beam again travels nearer the middle of the detector region if it had arrived beforehand too near the edge of the detector.

In a third method in accordance with the invention, the direction of the light beam is changed by the computer of the alignment device in accordance with the invention between two predefined directions, for example, by striking two mechanical stops. Then, the distance between the two components of the alignment device is automatically determined by the impact points of the light beam on the detector being measured in these two predefined directions of the light beam.

The invention is described below in greater detail with reference to the accompanying drawings.

DETAILED DESCRIPTION OF THE INVENTION

Figure 1:
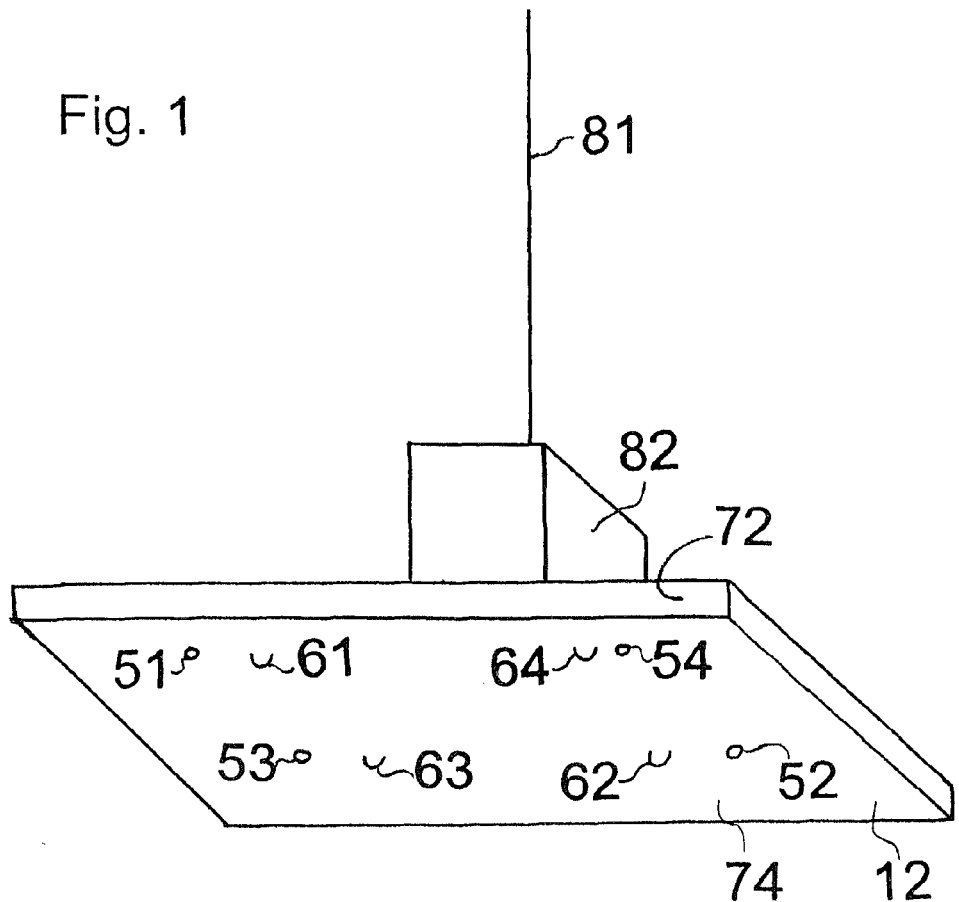
FIG. 1 is a perspective view of important components of the adjusting device.

Conventionally, alignment devices are fastened on shafts by a metal block with a prismatic recess being attached to the shaft with a chain. This metal block bears two round rods which run essentially radially, but parallel to one another. The actual measurement head which is provided with two metal pipes 13, 14, which are matched to the rods, is slipped onto these rods. When the measurement head has been moved into the correct position, it can be fixed with screw clamps. A carrier plate 11 for the components of the measurement head is fastened on the pipes 13, 14. Since the pipes 13, 14 run essentially radially relative to the shaft (see the in-use orientation of the plates in FIG. 2), the y-axis of FIG. 1 for a horizontally running shaft is likewise a radially running direction. When the laser is mounted on the top of the shaft, the direction of viewing along the y-axis corresponds to a view from overhead or from underneath.

The light source is mounted on a separate plate 12. This light source is a semiconductor laser or a LED which is mounted in a housing 82 and which emits a light beam 81 in the direction of the z-axis which corresponds to the longitudinal axis of the shaft1. The second plate 12 is securely fastened on the carrier plate 11, but can be tilted within certain limits. In the simplified representation of FIG. 1 the carrier plate 11 has two toe bearings 21, 22. Together with these toe bearings, two holes 25, 26 form the corners of a rectangle. These holes are provided with internal threads (not shown). From the back of the carrier plate 11, two screws 23, 24, whose tips are likewise used as bearings for the second plate 12, are screwed through these holes.

This plate 12 is provided with abutments 51-54 for the toe bearings. Along the edge 71 of the first plate 11, there is a support surface (not shown) on which the edge 72 of the plate 12 slidably rests. So that the plates 11, 12 can be connected to one another, they have fastenings 31-34, 61-64, in which helical springs can be suspended. These fastenings can be, for example, hemispherical wire bows or eye bolts. In practice, these fastenings 31-34, 61-64 are not mounted on the surfaces 73, 74 of the plates 11, 12, but on the surfaces opposite them. The helical springs are then routed around the small surfaces (for example, 71, 72) of the plates 11, 12. FIG. 1 is a simplified representation.

At this point, if the screw 24 in the plate 11 is turned, this motion essentially causes tilting of the plate 12 around the y-axis, while turning on the screw 23 caused tilting around the x-axis. The representation in FIG. 1 is generally not implemented in this way. On the one hand, the carrier plate should not be drilled through, and on the other hand, it is more useful as a result of the three-dimensionally tight conditions to operate the screws from overhead and to arrange them with their axes accordingly parallel to the y-axis. Then, it is necessary to convert the axial motion of the screws into tilting of the plate 12 by way of bell cranks or other suitable devices. One skilled in the art knows suitable methods for expanding the device for tilting by suitable support surfaces which on the surfaces 71, 72 and the other six smaller surfaces of the plates 11, 12 position the two plates relative to one without producing a change in the x and z directions, when the alignment devices are turned in measurement with the shafts to which they are attached.

Figure 2:
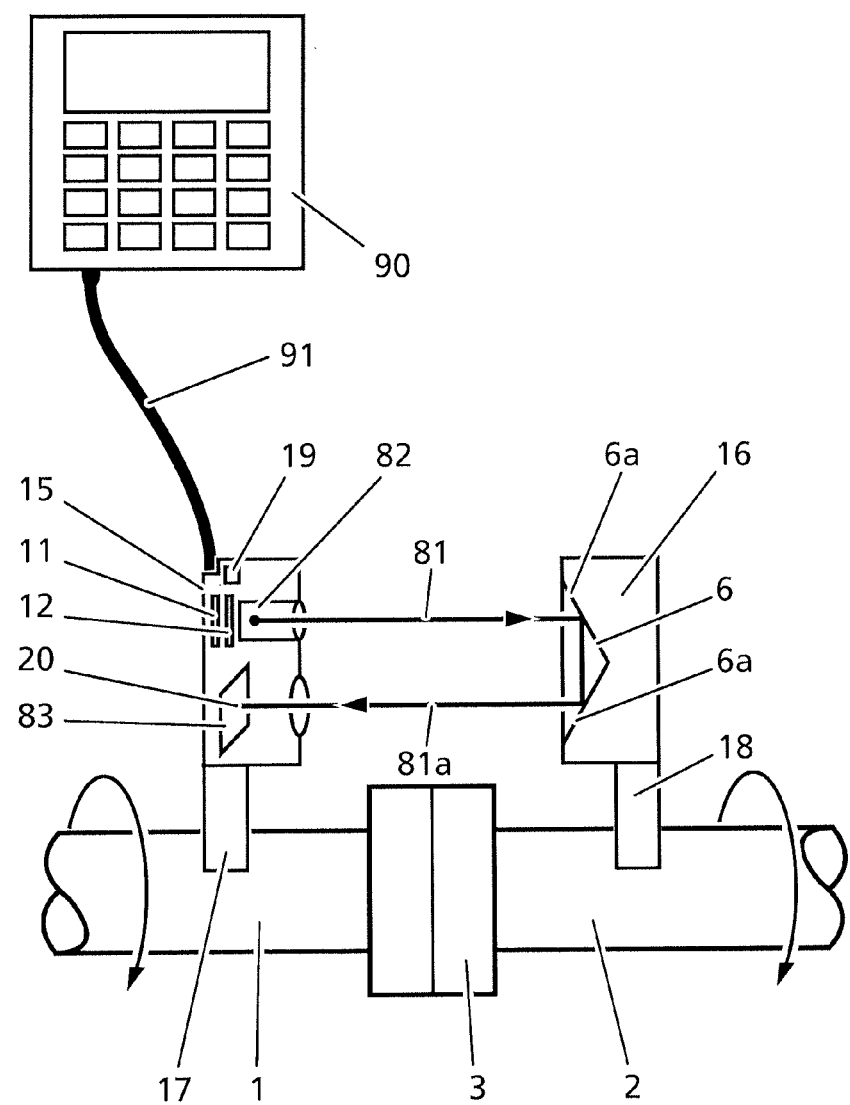
FIG. 2 schematically depicts an alignment device incorporating the adjusting device.

In FIG. 2, the two shafts 1, 2 and the coupling 3 which connects these shafts are shown. A first component 15 of the alignment device is mounted on the first metal block 17 and a second component 16 of the alignment device is mounted on a second metal block 18. In the upper part of the first component 15 is the light source 82 which emits the light beam 81 in the direction toward the second component 16. This second component 16 contains a reflector 6 which is made here as a prism with two mirrored surfaces 6a and which reflects the light beam 81 as a light beam 81a back to the first component 15, where it is incident on the detector 83 at the impact point 20. In the first component 15, the light source 82 is mounted on the plates 11, 12 shown in FIG. 1 so that they can be adjusted by a motor. The motors which are located in the first component 15 for adjusting the plate 12 relative to the plate 11 are triggered by the computer 90 of the alignment device which is connected to the first component 15 either by a cable 91 or wirelessly.

In accordance with the invention, at this point, there is motorized adjustment which makes it possible for personnel to undertake the often necessary adjustment of the laser beam relative to the desired impact point without touching the components 15, 16. Triggering of the motor or motors can be done via controls which are located on the computer 90 which are associated with the alignment device, the computer being necessary in any event for displaying of the alignment data and the necessary corrections. Alternatively, the motorized adjustment of the impact position of the light beam on the detector can also be automatically undertaken by a program in the computer 90.

The invention thus makes it possible to eliminate the need for the required precise positioning of the impact point 20 of the laser beam on the detector to have to be done by hand (it being sufficient to align the laser beam relative to the detector only roughly by hand), after the first fastening of the metal blocks 17, 18 on the shafts 1, 2, and therefore, before the start of the actual alignment measurement. The exact alignment of the light source in the component 15 can take place in accordance with the invention in that the alignment computer 90 produces adjustment of the plates 11, 12 relative to one another by a motor until the impact point 20 comes to rest in a given middle region around the center of the detector 83. The size of this middle region can be, for example, 20% of the area of the detector 83.

In another aspect of the invention, motorized adjustment is used to widen the measurement range of the detector. In order to determine the alignment, it is necessary for the shafts 1, 2 to be turned into different positions with the metal blocks 17, 18 and the components 15, 16 mounted on them. This rotation is indicated in FIG. 2 by the curved arrows surrounding the shafts 2, 3. As a result of this rotation, it can happen that the impact point 20 leaves the usable surface of the detector 83. Then, according to the prior art described in U.S. Pat. No. 6,040,903, it is necessary to change the position of one of the two components 15, 16 and the metal blocks 17, 18 which bear them on the respective shaft by turning the respective component and the metal block which bears it around the shaft such that impact point 20 on the detector 83 again comes to rest near the middle of the detector 83.

The motorized adjustment in accordance with the invention now makes it possible to track the light beam, and thus, the impact point 20 without intervening in the mounting of the components 15, 16 on the shafts 1, 2 when the impact point 20 has reached the edge region of the detector 83. The size of the edge region can be 10% or 5% of the area of the detector. A program in the computer 90, using the preceding movement of the impact point 20 on the detector 83 which has been caused by the rotation of the shafts 1, 2, computes in which direction and by which amount the direction of the light source must be adjusted and causes the corresponding adjustment by triggering the motors, and thus, a corresponding relative displacement of the plates 11, 12. When the impact point 20 has then come to rest again in a given region around the center of the usable surface of the detector 83, rotation of the shafts 1, 2 can continue, as can the actual measurement of alignment.

A third method calls for changing the position of the light beam on the detector 20 in a defined manner, for example, by moving from a first stop to a second stop. This changing of the direction of the laser beam by a defined angle makes it possible to compute the distance between the components 15, 16 using the resulting change of the position of the impact point 20 with simple geometrical methods. This computation can advantageously take place in the computer 90 of the alignment device which also triggers the motors for this distance determination.

The motors which are necessary for adjustment can be of various types, depending on the type of adjustment device used for the plate 12. If, as shown in FIG. 1, screws are used for tilting of the plate 12, the motors can be rotating motors whose shaft is provided with an outside thread. If, as described above, bell cranks are used, the screws can be replaced by suitable motors which execute linear motion. Linear motors can directly replace the screws, even if there are no bell cranks.

In general, piezomotors are preferred for carrying out the invention. In one especially preferred configuration, linearly acting piezomotors are used.

Of course, the invention is not limited to the use of carrier plates, the replacement of screws by motors or the connection of the carrier plates by springs. A plurality of other measures will be apparent to one skilled in the art from the foregoing with which precision adjustment of the beam direction of a laser can be effected in accordance with the invention.

In the measurement head which contains the laser, a battery compartment is contained anyway to supply the laser and the interface for communication with the computer. From there, power can also be supplied for operating the motors for alignment of the lasers.

Furthermore, the subject matter of the invention is that triggering of the motors is not undertaken on the measurement head itself, but on the computer 90 which is an existing part of alignment devices so that such need not be added to implement the invention. The computer 90 is connected to the measurement head via electrical lines or wirelessly. This connection is used, for example, to transmit information which is to be modulated onto the laser beam, or if there is a detector in the measurement head, for transmission of the measured values of the detector to the computer of the alignment device.

It is possible via this connection to transmit data from the computer of the alignment device to the measurement head, which data indicate to the measurement head which motor is to be operated, in which direction this motor is to run and how long it is to run. These portable computers are provided with cursor keys, four-way buttons or other input means such as a mouse, touchpad, trackstick, trackball or joystick. The motors in the measurement head with the laser are triggered via suitable software in interplay with these input devices. Of course, as described above, the direction of the light beam can also be changed by the computer itself via a corresponding program.

In the adjustment of the direction of the light beam controlled via controls, the user of this alignment device can easily observe and influence the impact point of the laser beam without awkwardly having to observe the impact point with his eyes in the vicinity of the measurement device on the shaft, and on the other hand, having to adjust poorly accessible screws in this attitude in a very sensitive manner. When the laser first strikes the detector element, a display of the impact point on the display of the computer is also easily possible so that direct observation in the vicinity of the measurement head on the second shaft is no longer necessary.

It goes without saying that the invention can also be advantageously used with types of alignment devices other than the embodiment shown in FIG. 2. Thus, there are alignment devices in which in one of the two components 15, 16, there is a light source and in the other, there are one or two detectors located in succession in the beam path. In again other alignment devices, in each of the two components 15, 16 there are a respective light source and a detector that the light source and detector are opposite one another in pairs. In the latter embodiment, the beam adjustment in accordance with the invention can be used for one or for both light sources.

What is claimed is:

1. Method for adjusting a laser beam of an alignment device, comprising the steps of: respectively mounting first and second components of the alignment device in a fixed position on an outer surface of first and second rotatable shafts of machine parts that are operatively connected to each other by a coupling and the alignment of which is to be detected, wherein a laser device and motors are located in at least one of the first and second components of the alignment device and wherein the motors are connected to a support of the laser device to adjust the position of the laser device within the component in which the laser device is located and the position of the laser device on the rotatable shafts to be aligned with respect to each other, the motors being connected to a computer of the alignment device in a manner enabling the computer to control operation thereof for setting the position of the laser device for causing an impact point of the laser beam to be located in a predefined region that is near a center of a detector that is positioned for receiving said laser beam;

using the computer of the alignment device to adjust an emission direction of the laser beam from the laser device located within said at least one of the first and second components of the alignment device so as to position an impact point of the laser beam in a predefined region of the detector that is near a center of the detector, the computer causing the motors connected to the support of the laser device within the component in which the laser device is located to adjust the position of the laser device on the shafts the alignment of which is to be detected in response to impinging of the laser beam at an impact point outside of said predefined region; and then, commencing detection of the state of alignment of the shafts relative to each other.

2. Method in accordance with claim 1, wherein control commands for triggering the motors are transmitted to the motors via controls of the computer.

3. Method in accordance with claim 1, wherein control commands for triggering the motors are transmitted to the motors from a program in the computer.

4. Method in accordance with claim 1, comprising the further steps of:

during detection of the state of alignment of the shafts relative to each other, determining when the impact point of the light beam reaches a predefined edge region of the detector, using the computer to trigger the motors to adjust the emission direction of the laser device beam to reposition the impact point of the laser beam on the detector to the predefined region of the detector near the center.

5. Method in accordance with claim 4, wherein control commands for triggering the motors are transmitted to the motors via controls of the computer.

6. Method in accordance with claim 4, wherein control commands for triggering the motors are output to the motors from a program in the computer.

7. Method in accordance with claim 1, wherein the adjusting of the emission direction of the laser beam moves the laser device by a predefined angle, and wherein the computer determines the distance between the laser device and the detector from a displacement of the impact point of the laser beam on the detector which has been caused by the adjusting of the emission direction of the laser device.

8. Alignment device, comprising the following: a computer;

first and second components and parts configured for mounting the first and second components in a fixed position on an outer surface of a respective one of first and second shafts of rotatable machine parts which are to be aligned with respect to each other, at least the first component having a laser device for radiation of a laser beam located therein and at least one of the first and the second component having a detector or reflector upon which the laser beam is to impinge;

wherein motors within the component in which the laser device is located are connected to a support of the laser device to adjust the position of the laser device within the component in which the laser device is located on the shafts to be aligned with respect to each other, the motors being connected to the computer in a manner enabling the computer to control operation thereof for setting the position of the laser device for causing an impact point of the laser beam to be located in a predefined region of the detector that is near a center of the detector in response to impinging of the laser beam at an impact point outside of said predefined region.

9. Device in accordance with claim 8, wherein input elements of the computer of the alignment device are entry elements for triggering the motors.

10. Device in accordance with claim 8, wherein the computer has a program for triggering of the motors.

11. Device in accordance with claim 8, wherein at least one of the motors is a linear motor.

12. Device in accordance with claim 8, wherein at least one of the motors is a piezomotor.

\* \* \* \* \*